United States Patent
Kuksenkov

(10) Patent No.: US 6,768,750 B2
(45) Date of Patent: Jul. 27, 2004

(54) MULTI-SPECTRAL LINE RAMAN LASER

(75) Inventor: Dmitri V. Kuksenkov, Painted Post, NY (US)

(73) Assignee: Corning Incorporated, Corning, NY (US)

(*) Notice: Subject to any disclaimer, the term of this patent is extended or adjusted under 35 U.S.C. 154(b) by 87 days.

(21) Appl. No.: 10/292,101

(22) Filed: Nov. 12, 2002

(65) Prior Publication Data

US 2004/0091000 A1 May 13, 2004

(51) Int. Cl.⁷ .................................................. H01S 3/10
(52) U.S. Cl. .............................. 372/20; 372/3; 372/6; 372/23; 372/98; 372/102
(58) Field of Search ..................... 372/20, 6; 385/12, 385/37, 136

(56) References Cited

U.S. PATENT DOCUMENTS

| | | | |
|---|---|---|---|
| 6,229,827 B1 * | 5/2001 | Fernald et al. ................ | 372/20 |
| 6,363,089 B1 * | 3/2002 | Fernald et al. ................ | 372/20 |
| 6,370,310 B1 * | 4/2002 | Jin et al. ..................... | 385/136 |
| 6,470,036 B1 * | 10/2002 | Bailey et al. ................. | 372/20 |
| 6,597,711 B2 * | 7/2003 | Fernald et al. ................ | 372/20 |
| 2002/0071626 A1 * | 6/2002 | Davis et al. .................. | 385/12 |
| 2002/0150335 A1 * | 10/2002 | Lachance et al. ............. | 385/37 |

OTHER PUBLICATIONS

*Configurable Three–Wavelength Raman Fiber Laser for Raman Amplification and Dynamic Gain Flattening*, By M.D. Mermelstein et al., 2001 IEEE, 1286–1288.

* cited by examiner

*Primary Examiner*—Leon Scott, Jr.
(74) *Attorney, Agent, or Firm*—Mary Y. Redman; Juliana Agon

(57) ABSTRACT

A multiple spectral line Raman laser having adjustable relative power output between different spectral lines is provided. The laser includes a lasing cavity, first and second reflectors optically coupled to a back end of the cavity that reflects substantially all light having wavelengths of $\lambda_1$ and $\lambda_2$, respectively, and a tunable reflector assembly optically coupled to a front end of the cavity that reflects a selected proportion of said light having wavelengths of $\lambda_1$ and $\lambda_2$ in response to a single source of strain to control relative power output of light at these wavelengths. The lasing cavity may be a linear length of gain fiber, and the tunable reflector may include a single fiber Bragg grating (FBG) having a trapezoidal reflection profile, or a pair of fiber Bragg gratings mounted on either side of a flexible substrate such that when the substrate is bent, one FBG stretches while the other is compressed. Alternatively, the lasing cavity may be a fiber ring cavity, and the reflector assembly may include a bendable wavelength-selective fiber coupler.

30 Claims, 4 Drawing Sheets

MULTI-SPECTRAL LINE RAMAN LASER

BACKGROUND OF THE INVENTION

This invention generally relates to Raman lasers, and is particularly concerned with a multi-spectral line Raman laser.

The many advantages associated with Raman optical amplifiers has resulted in their increased use in optical telecommunication networks. Such amplifiers are based on stimulated Raman scattering, known in the art as SRS effect. In such amplifiers, a source of pump light is coupled to a length of gain fiber. The pump photons scatter off the vibrational modes of the gain fiber's lattice matrix and coherently add to the lower-energy (longer wavelength) signal photons. Unlike erbium-doped fiber amplifiers, the gain fiber used in Raman amplifiers may be the transmission fiber itself. Additionally, since the SRS effect is not dependent upon the energy level structure of a dopant, gain may be provided at essentially any wavelength if a corresponding source of pump light is available.

Despite these advantages, the practical use of Raman amplifiers has been limited by the very high pump light power that is typically required to achieve usable gain (caused by the fact that the SRS effect is a nonlinear optical effect), and the relatively narrow spectral output of such amplifiers which, of course, limits its signal transmission spectrum.

The problem of high pump power has been largely solved by the development of cascade Raman lasers having output powers of greater than one watt. In a standard configuration, the cascaded Raman laser is pumped by a high-power, double-clad Nd or Yb fiber laser and generates light in the 1420–1490 nm spectral range. This light can then be launched backwards in the fiber transmission line, which functions as the gain fiber, and provides distributed Raman amplification of the optical signal conducted through the line in the last 20 kilometers or so of the fiber span. In many current system designs, such Raman amplification is combined with the amplification from erbium-doped fiber amplifiers (EDFAs) in order to capitalize on the advantages of both, i.e., the lowered effective noise figure of a distributed Raman amplifier, and the high efficiency of an EDFA.

Unfortunately, in such cascaded Raman lasers, narrow spectral output is still a problem as only one relatively narrow spectral line is generated which corresponds to the fifth or sixth Stokes order of the Yb or Nd fiber laser pump. By contrast, at least two spectral lines with approximately 25 nm spacing (typically at about 1429 and 1455 nm) are needed to achieve a relatively flat gain curve, i.e., gain which does not change with wavelength by more than about 1 decibel in the C-band spectral range which corresponds to between about 1535–1565 nm. At least three different spectral lines are needed if flat amplification is desired for a combined C and L band amplifier, which covers a spectral range of between about 1535–1610 nm. Even if the narrow spectrum problem associated with such cascaded Raman lasers is solved by the generation of two or more spectral lines, some sort of means of dynamically adjusting the relative amounts of power generated between the spectral lines is necessary in order to compensate for the possible "tilt" or "ripple" which might occur between the powers of the channels transmitted by the amplifier.

One technique for generating multiple spectral line outputs in Raman lasers is to split the Yb or Nd fiber laser output into several approximately equal parts and use them to pump several cascaded Raman wavelength converters, each with its own spectral output line. However, because threshold power conditions need to be met in every converter, the overall efficiency in such a technique is limited. Additionally, the amount of components needed to achieve multiple spectral lines is effectively doubled or tripled, thereby increasing package size, complexity, and cost.

Another approach employs two pairs of tunable fiber Bragg gratings as reflectors in a cascaded Raman resonator to generate a power output at two different spectral lines. By simultaneously stretching the two pairs of gratings, a controlled wavelength mismatch may be created between back and front reflector spectral profiles, thereby changing the amount of optical feedback and hence the power provided to the two lasing lines. However, the mismatching of the reflectors also results in degraded efficiency, since a same percentage of the resonating light can escape out of the back of the lasing cavity as is generated out of the front end.

In a variation of the aforementioned approach, variable reflection from a temperature-tuned FBG is employed. Relatively long output FBGs are coated with varying thickness electric resistance heaters. Uneven heating causes "chirp" in the FBG, decreasing maximum reflection. Simultaneously, the maximum reflection wavelength is shifted, which necessitates the use of a second uniform thickness electrical resistance heater which uniformly stretches the FBG to compensate for the shift. While this particular technique provides both multiple spectral lines and a means for adjusting the amount of relative power present in each line, it also requires the adjustment of two separate parameters to change each output mirror reflection, i.e., an adjustment of both the non-uniform and the uniform electrical resistance heaters to create the "chirp" in the FBG while simultaneously compensating for the shift in maximum reflection wavelengths. Such dual adjustment of the heaters is not only cumbersome, but slow. Finally, because this technique depends upon the introduction of chirp in the grating period, the width of the resulting reflection bands may change, which in turn can cause unwanted mismatches between the back and front reflectors and thereby degrade lasing efficiency.

Clearly, what is needed is a multiple-spectral line Raman laser having a means for dynamically controlling the relative power output of the different spectral outlines which is simple and inexpensive in structure and operation. Ideally, such a Raman laser would be capable of generating at least three spectral lines in its power output so that the resulting gain will be relatively flat. Finally, the mechanism for dynamically controlling the relative power between the spectral lines should not result in light losses which substantially degrade lasing efficiency.

SUMMARY OF THE INVENTION

Generally speaking, the invention is a multiple spectral line Raman laser that overcomes or at least ameliorates the aforementioned shortcomings associated with the prior art. To this end, the laser of the invention comprises a lasing cavity, first and second reflectors optically coupled to a back end of the cavity that reflect substantially all light having wavelengths of $\lambda_1$ and $\lambda_2$, respectively, and a tunable reflector assembly optically coupled to a front end of the cavity that reflects a selected proportion of light having wavelengths $\lambda_1$ and $\lambda_2$ in response to a single source of strain in order to control the relative power output of light at these wavelengths.

In one embodiment of the invention, the tunable reflector assembly includes a stretchable fiber Bragg grating (FBG) which has a trapezoidal reflection profile. The amount of reflection of $\lambda_2$ changes substantially linearly as strain is applied to the optical fiber that the FBG is written on, and the reflection band is at least 4 nm in width. Additionally, the wavelengths $\lambda_1$ and $\lambda_2$ are separated by at least 4 nm and at most by 30 nm. The single source of strain includes a mechanism, such as a piezoelectric driver, that stretches or relaxes the FBG.

In another embodiment, the tunable reflector assembly includes a pair of fiber Bragg gratings (FBGs) mounted on opposite sides of a flexible substrate. A single source of strain applies a bending force on the substrate to stretch one of the FBGs while simultaneously compressing the other. Like the first embodiment, the single source of strain may include a piezoelectric driver.

In both the aforementioned first and second embodiments, the lasing cavity is linear, and additional rear reflectors and tunable reflector assemblies may be optically coupled to the back and front ends of the cavity, respectively, in order to reflect selected portions of light having a wavelength between $\lambda_3$ and $\lambda_4$, etc.

In still a third embodiment of the invention, the lasing cavity is a fiber ring cavity and the tunable reflector assembly includes a wavelength-selective fiber coupler that couples the front and back of the ring cavity to input and output waveguides, respectively. First and second reflectors are coupled to the input waveguide, and third and fourth reflectors are coupled to the output waveguide. The wavelength-selective fiber coupler transmits variable proportions of light having wavelengths of $\lambda_1$ and $\lambda_2$, in response to an application of a mechanical bending force. The single source of strain of the tunable reflector assembly in this embodiment may include a stepping motor that extends and retracts a driving rod via a gear train.

DETAILED DESCRIPTION OF THE INVENTION

Figure 1:
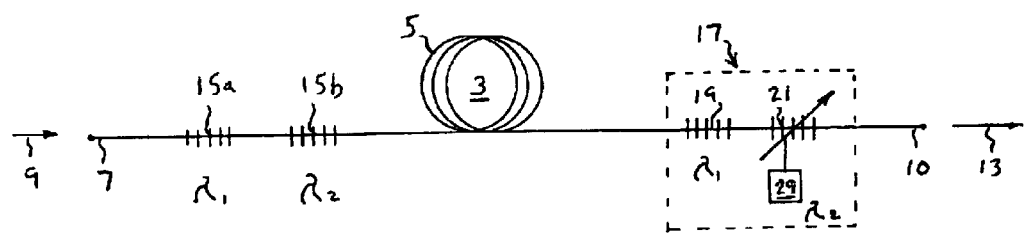
FIG. 1 is a schematic diagram of the first and second embodiments of the Raman laser of the invention.

With reference now to FIG. 1, wherein like numerals designate like components throughout all of the several Figures, the Raman laser of the invention 1 includes a lasing cavity 3 formed from a length of gain fiber 5 having an inlet or back end 7 for receiving light from a source 9 of pump light, and an outlet or front end 10 for transmitting amplified light 13. Lasing is accomplished by means of stimulated Raman scattering, wherein photons from the light pump 9 scatter off the vibrational modes of the lattice matrix of gain fiber 5 and coherently add to lower-energy (long wavelength) signal photons simultaneously transmitted through the fiber 5.

Figure 2:
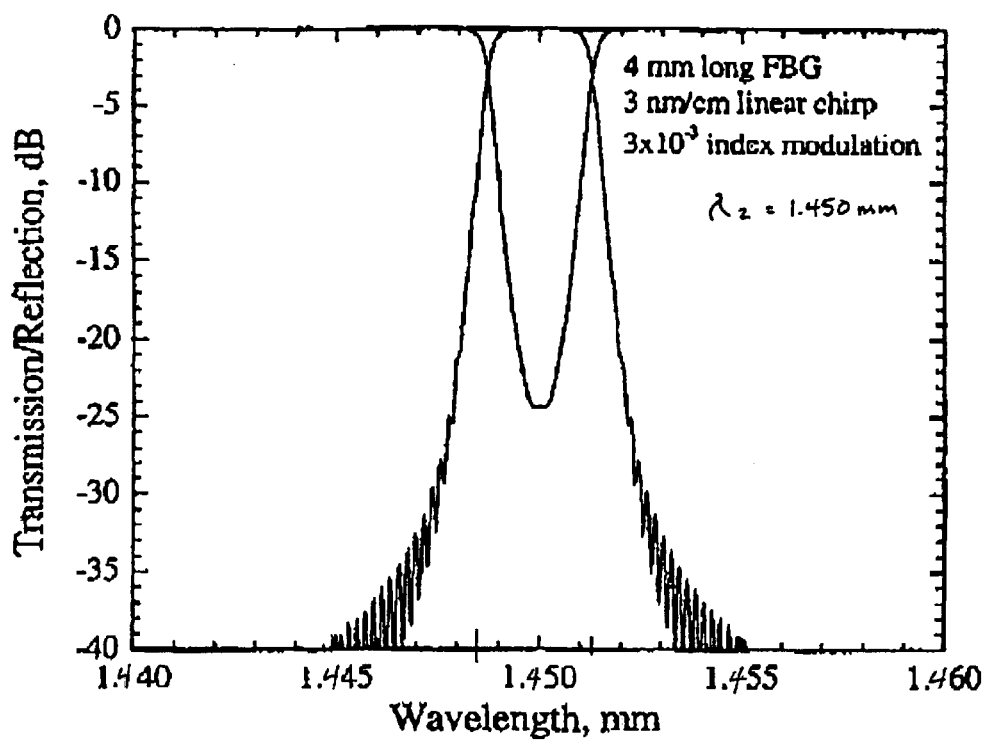
FIG. 2 is a graph illustrating the transmission and reflection spectra for one of the fiber Bragg grating (FBG) back reflectors of the laser illustrated in FIG. 1.

The laser 1 includes two fiber Bragg gratings (FBGS) 15a, b serially written into the back end 7 of the laser 1 as indicated. Both FBGs 15a, b are standard or fixed FBGs with a maximum reflection of more than 99% and a reflection width of about 1 nm. The reflectivity of FBG 15a is centered around a wavelength of $\lambda_1$ which equals 1.430 mm, while the reflectivity of FBG 15b is centered around $\lambda_2$ which corresponds in this example to 1.450 mm. FIG. 2 illustrates the reflectivity profile of FBG 15b; however, the profile for FBG 15a is identical in shape, the only difference being that it is centered at a wavelength of 1.430 mm. While the central wavelength of reflectivity of FBG 15a, and FBG 15b is separated by 20 nm in this example, the amount of separation may vary between 4 nm and 30 nm and still achieve the objective of the invention.

Figure 3:
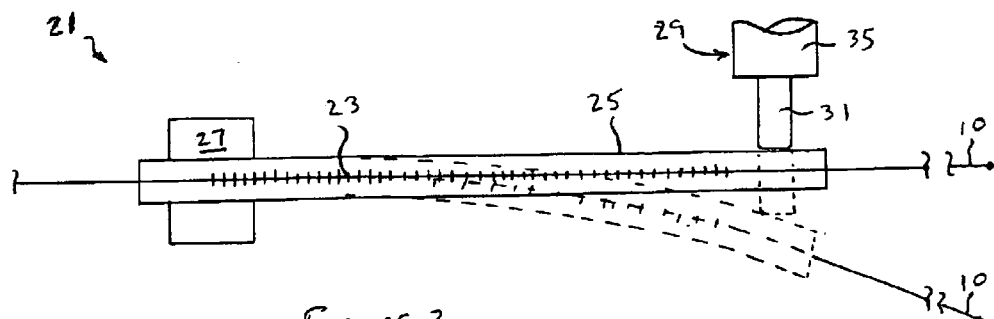
FIG. 3 illustrates the tunable FBG reflector mechanism of the first embodiment of the invention.

The front end 10 of the lasing cavity 3 includes a tunable reflector assembly 17 formed from a fixed FBG reflector 19 written directly into the optical fiber, and a tunable FBG reflector mechanism 21. The front FBG reflector 19 also has about 1 nm reflection width and a central reflection wavelength $\lambda_1$ which is exactly the same as that of back end FBG 15a, i.e., 1.430 mm. As is best seen in FIG. 3, the tunable FBG reflector mechanism includes an FBG 23 having the trapezoidal reflection profile indicated in the graph of FIG. 4. FBG 23 is mounted on or within a flexible substrate 25 which is secured at one end by a cantilevered mount 27. A single strain source 29 having an extendible and retractable driver 31 engages the opposite end of the flexible substrate 25. A motor 35 which may be piezoelectric selectively extends or retracts the driver 31 in order to bend the substrate 25, which in turn stretches or relaxes the FBG 23.

Figure 4:
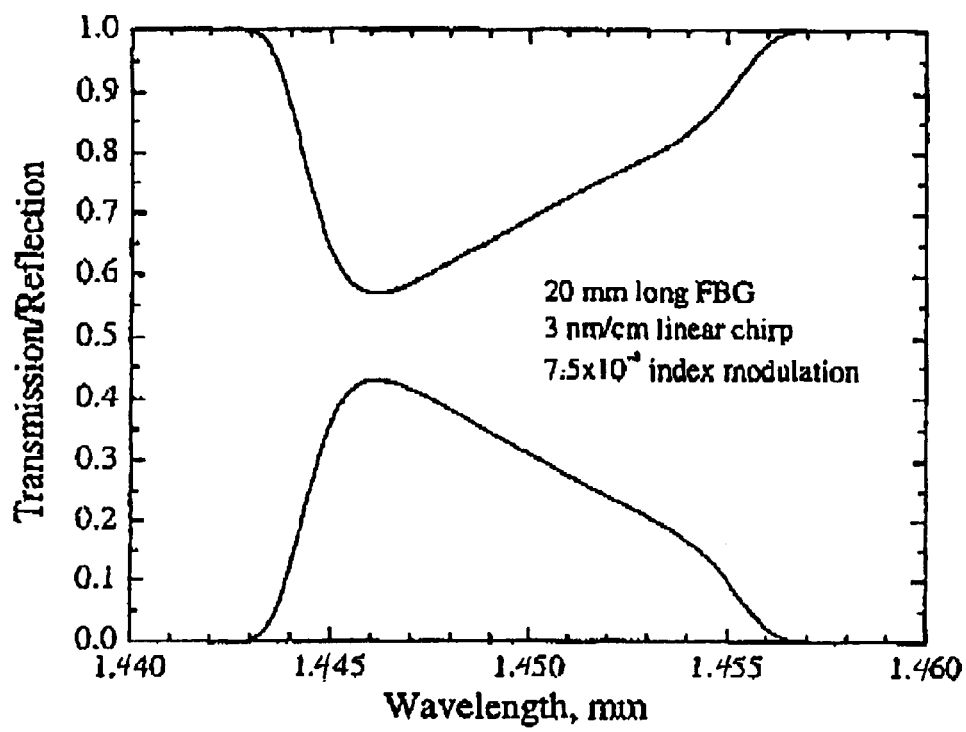
FIG. 4 is a graph of the trapezoidal reflection profile of the tunable FBG of the first embodiment.

The graph of FIG. 4 illustrates how the stretching or relaxing of the FBG 23 can adjust the relative power between the dual spectral line output for the Raman laser 1. The trapezoidal reflection profile of FBG 23 provides it with a reflection width of at least 5 nm and a linear change in maximum reflection as a function of wavelength, from+X% to −X% off its design value of Y%, where Y% is the reflection needed to produce approximately equal output power between the two output spectral lines.

If the fixed-back FBG 15b has the central wavelength $\lambda_2$ which corresponds to the extreme "red" (long-wavelength) end of the front reflector trapezoidal profile, then the amount of mirror loss for $\lambda_2$ is approximately 1−Y+X% in our example. The output reflector can be relatively easily tuned by at least 5 nm (−0.35% of $\lambda_2$ if $\lambda_2$ is around 1.450 mm) by simply stretching the length the FBG 23. As the FBG 23 is tuned, the amount of mirror loss for $\lambda_2$ will decrease until it reaches 1−Y−X%. In other words, by strain tuning the trapezoidal FBG 23, the front mirror reflection for the output wavelength $\lambda_2$ can be changed by ±X%. The amount X is chosen so that only $\lambda_2$ is lasing when the reflection is Y+X%, and only $\lambda_1$ is lasing when the reflection is Y−X%. Any given balance of power for spectral lines centered at $\lambda_1$ and $\lambda_2$ can be achieved for intermediate values of reflection. For a typical cascaded Raman laser, an X of 10% will be sufficient.

An important point to note is that unlike prior art that utilizes a pair of FBGs in combination with four heaters within a 1 nm wide reflection band of the back reflector at $\lambda_2$, reflectivity of the trapezoidal front reflector is only changing by a few percent. Therefore, the lasing line will always be centered at $\lambda_2$ and therefore experience a nearly 100% reflection of the back end, avoiding the unwanted loss of light associated with such prior art configurations.

An additional pair of FBGs consisting of another fixed back reflection and an additional tunable FBG reflector mechanism can be added if a three spectral line output is desired, and so forth. For any given number of output wavelengths, the number control parameters (which in this invention is the number of single strain sources) needed to achieve a given distribution of output powers is one less, since it is assumed that one of the spectral line outputs is accomplished by the fixed reflectors.

A technique called apodization, which means introducing a variation in the grating strength along its length, may be used to produce the required trapezoidal reflection profile of FBG 23. If the grating 23 is written through a phase mask, apodization can be imposed by masking the ultraviolet beam used to write the grating. FIG. 4 represents a numerical simulation result for a 20 mm long FBG with linear period chirp of 3 nm/cm and an apodization profile A given by a product of a linear function in an eighth order Gaussian of the form $$A = 1.4 \cdot \left(0.75\frac{x}{L} + 0.25\right)\left(-2\left(\frac{x-L/2}{0.7L}\right)^8\right)$$

where L equals 20 mm, which is the length of the grating, and x is the coordinate along the length. As can be seen from FIG. 4, the resulting grating reflection changes linearly from about 43% to about 17% within approximately an 8 nm wide central region and falls down at the edges. Tuning this grating by 8 nm can be by stretching it for about 0.5% of its original length, which can be safely done with the single source of strain 29 illustrated in FIG. 3.

Interestingly, the back FBG 15b may be written using the same phase mask producing 3 nm/cm chirp in the grating period. As can be seen in FIG. 2, a 4 mm long grating with at Gaussian apodization profile and maximum index modulation depth of $3 \times 10^3$ will provide greater than 99.5% reflection within approximately a 1 nm wide spectral band.

Figure 5:
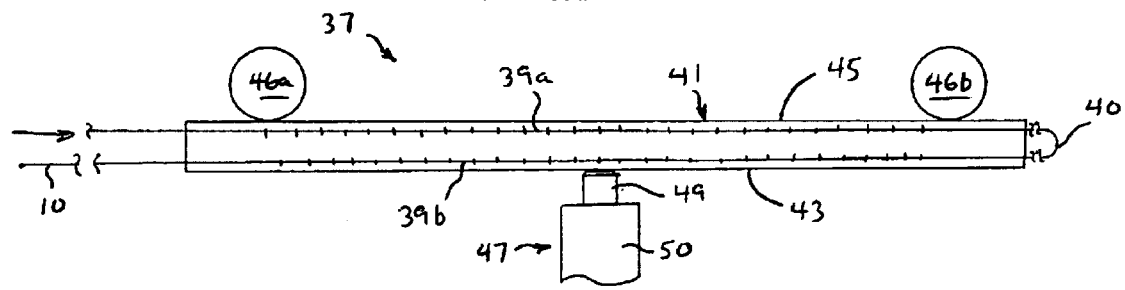
FIG. 5 illustrates the tunable FBG reflector mechanism of a second embodiment of the invention.

FIG. 5 illustrates the tunable FBG reflector mechanism 37 of a second embodiment of the invention, which embodiment is otherwise identical with respect to the first embodiment described with respect to FIG. 1. Here, a pair of FBGs 39a, b mounted on a front side 43 and a back side 45 of a flexible substrate 41 have replaced the single FBG 23 having the trapezoidal reflection profile. In lieu of the cantilever mount 27, tunable FBG reflector mechanism 37 includes a pair of support pins 46a, b which engage opposite ends of the back side 45 of the substrate 43. The single strain source 47 is centrally disposed with respect to the front side 43 of the substrate 41, and includes an extendible and retractable driver 49 operated by a motor 50, which may be either piezoelectric, or formed from a combination of a step motor and a gear train.

Figure 6:
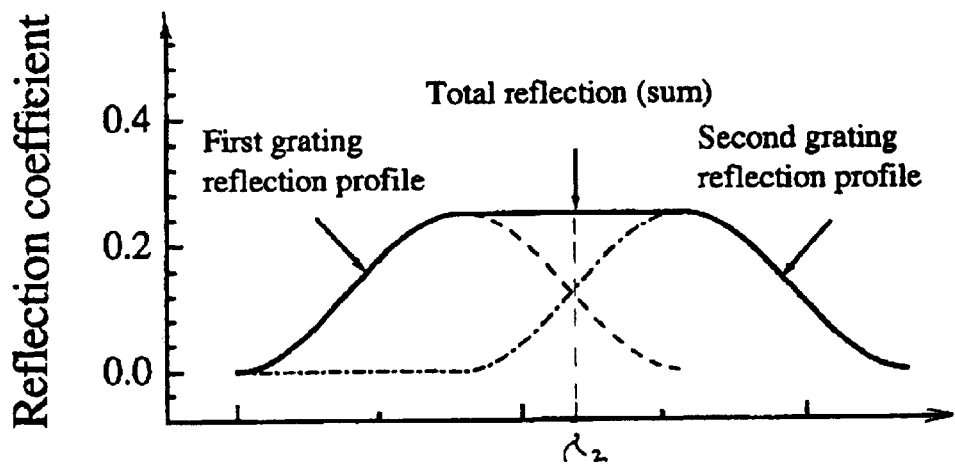
FIG. 6 is a reflection profile of the two FBGs of the tunable FBG reflector mechanism illustrated in FIG. 5 under relaxed conditions.
Figure 7:
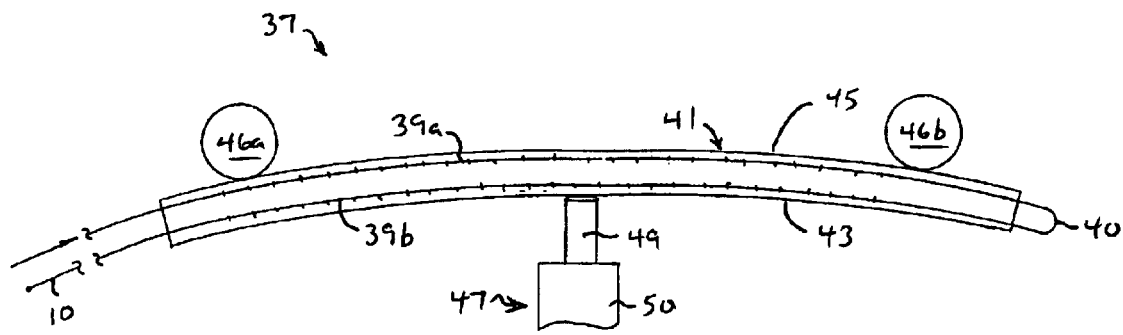
FIG. 7 illustrates how the single source of strain of the tunable FBG reflector mechanism of the second embodiment operates to bend the substrate that the two FBGs are mounted on by the application of strain thereto.

FBGs 39a, b are optically identical to one another, and are written into the optical fiber forming the front end of the lasing cavity. They are serially interconnected by means of U-shaped fiber optical loop 40, and are affixed by glue for example either onto the front and back sides 43, 45 of the substrate 41, or are encased in the substrate just below these surfaces (as shown in the Figure). In the preferred embodiment, fiber gratings 39a, b are approximately 5 inches apart and have spectral reflection profiles that are about 1 nm wide and which cross each other at about half of their maximum reflectivities. FIG. 6 is a graph illustrating a combined reflection coefficient of the two gratings 39a, b when the flexible substrate 41 is in an unflexed position, as is illustrated in FIG. 5. Note that the sum of the two reflections under such circumstances will have the same maximum value as each of the individual gratings 39a, b, i.e., about 25%.

Figure 8:
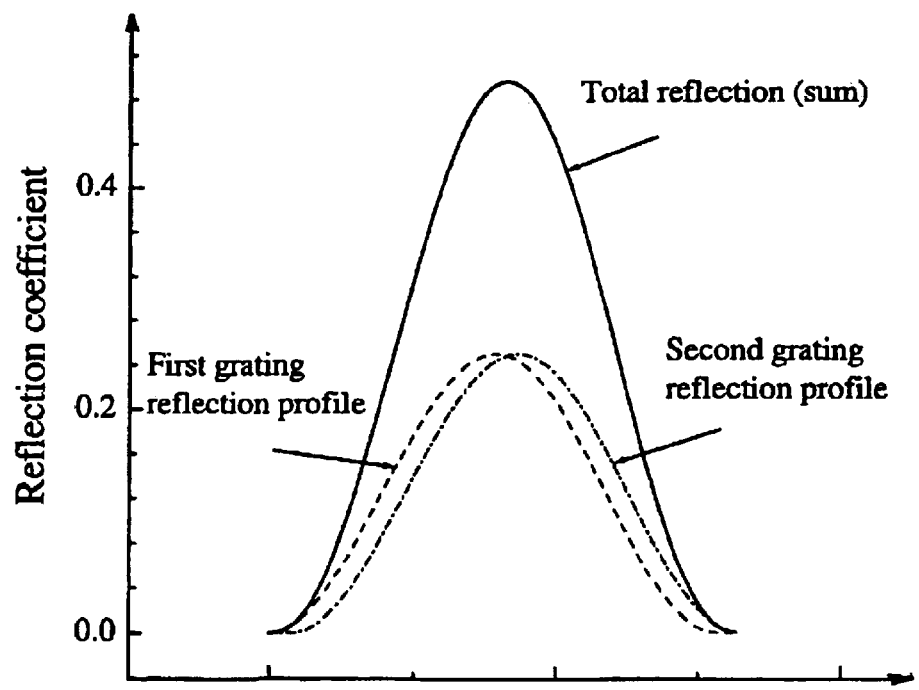
FIG. 8 is a reflection profile of the two FBGs of the tunable FBG reflector mechanism of the second embodiment in the strained condition illustrated in FIG. 7.

When the motor 50 of the single strain source is actuated to extend the driver 49, the substrate 41 becomes bent between the two support pins 46a, b. Simultaneously, grating 39 a mounted on the back side of the substrate 41 is stretched, while grating 39b mounted on the front side 43 of the substrate 41 is compressed. Since the stretching of the back side grating 39a increases its period, its reflection peak moves to a longer wavelength or to the right. Conversely, because the front side grating 39b is compressed, its period is decreased and its reflection peak moves to a short wavelength, or to the left. The peaks move closer together and eventually overlap each other, as is illustrated in FIG. 8.

The total reflection, or the sum of the two individual reflections of FBGs 39a, b becomes about 50%, or twice as high as it was before the substrate 41 was bent by the driver 49. Thus we have a reflector assembly tunable from between about 25% to 50% peak reflection by changing only one parameter—the amount of bending applied to the substrate 41 by the driver 49. The advantage of this second embodiment of the invention is that the FBGs 39a, b are simpler in design and may be more easily manufactured than single FBG 23 having a trapezoidal reflection profile. They can also be physically quite short (i.e., between 2 and 3 mm) thereby minimizing the excess loss that is always present in longer gratings when silica fibers are irradiated with ultraviolet light in order to write the grating. Note that as the gratings 39a, b are tuned via the bending of the substrate 41, that the central wavelength $\lambda_2$ of the total reflection profile will stay practically unchanged. The corresponding FBG back reflector should be made to reflect a high percentage (over 99%) of this same central wavelength $\lambda_2$.

Figure 9A:
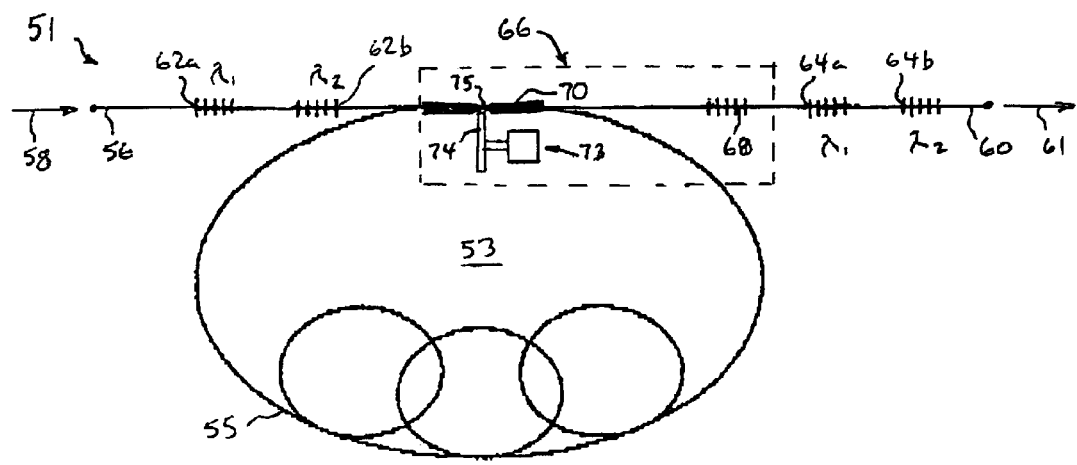
FIG. 9A illustrates a third embodiment of the invention wherein the lasing cavity is a fiber ring cavity.
Figure 9B:
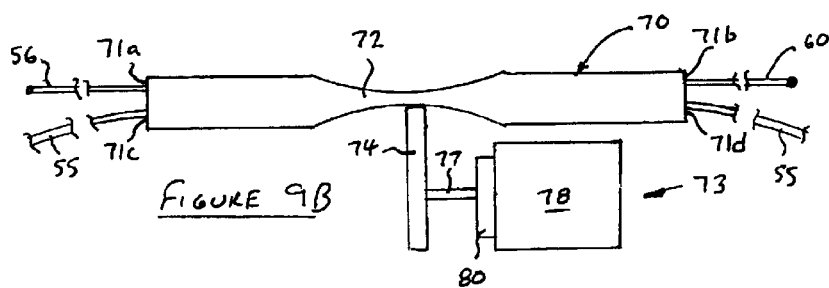
FIG. 9B illustrates how the wavelength-selective coupler of the tunable reflector assembly of the third embodiment is bent by a single source of strain.

With reference now to FIGS. 9A and 9B, the third embodiment 51 of the multi-spectral line Raman laser of the invention includes a fiber ring cavity 53 in lieu of the linear lasing cavity of the first and second embodiments. The fiber ring cavity 53 is formed from a coil 55 of optical fiber whose ends are interconnected as shown. The laser 51 has an inlet or back end 56 connected to a source of pump light 58. The pump source 58 could be a light emitting diode, a solid state laser, a rare earth doped fiber, or another Raman fiber laser. One practical configuration would be a Yb-doped-clad fiber laser operating at 1.093 mm, pumping a phosphosilicate fiber Raman laser which generates 1.278 mm light in the first phosphosilicate Stokes order. This 1.278 mm light can then be used to pump the optical fiber coil 55, which is formed from $GeO_2$-fiber, which generates an intermediate wavelength of 1.356 mm in the first Stokes order and two output wavelengths $\lambda_1$ and $\lambda_2$ corresponding to 1.429 mm and 1.455 mm respectively in the second $GeO_2$ related Stokes order.

The back end 56 of the laser 51 includes a pair of fiber Bragg gratings 62a, b serially written into optical fiber which reflects at least 99% of light at wavelength $\lambda_1$ and $\lambda_2$, respectively. The front end 60 of the laser 51 also includes a pair of fiber Bragg gratings serially written into the optical fiber forming the same having reflection coefficients R1 and R2 between 5% and 70% such that in the absence of additional wavelength field activity, lasing at wavelengths $\lambda_1$ and $\lambda_2$ has approximately the same power threshold.

Figure 10:
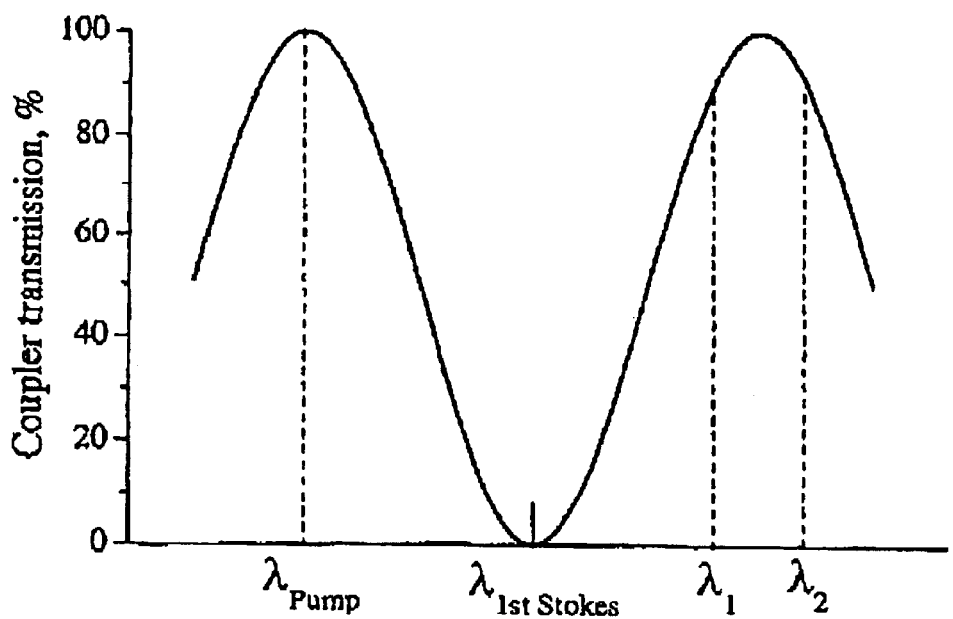
FIG. 10 is a graph illustrating how the coupler transmission of the different wavelengths $\lambda_1$ and $\lambda_2$ varies with the bending of a tapered end of the coupler.

The laser 51 further includes a tunable reflector assembly 66 formed from an FBG pump light reflector 68, and a wavelength selective fiber coupler 70. The fiber coupler 70 that closes the fiber ring cavity 53 is designed to couple nearly all of the pump light in and out of the ring cavity 53, while the pump light reflector 68 is designed to reflect back nearly 100% of all of the pump light that is not used for generating output at wavelengths $\lambda_1$ and $\lambda_2$. At the same time, the fiber coupler 70 is designed to transmit nearly all of the intermediate $1^{st}$ order Stokes light, so light at the corresponding wavelength can circulate in the fiber ring cavity 53 with minimum loss. As soon as the Raman gain provided by the source of pump light 58 is sufficient, lasing in the $1^{st}$ Stokes order will start, generating light that will in turn pump the front end 60. Due to the natural spectral periodicity of the Stokes orders, and the transmission function of the coupler that is also designed to be periodic as is illustrated in the graph of FIG. 10, most of the light at the output wavelengths $\lambda_1$ and $\lambda_2$ will be coupled out of the ring.

The operation of this embodiment of the invention is best understood if we consider that the wavelength selective fiber coupler 70 has its maximum coupling wavelength positioned right in the middle of $\lambda_1$ and $\lambda_2$. Under such circumstances, some approximately equal amount of light at $\lambda_1$ and $\lambda_2$ is not coupled out, but instead is circulated in the fiber ring cavity 53 producing a small amount of optical feedback in addition to that provided by the FBG front reflectors 64a, b. The fiber coupler 70 can be tuned so that its transmissions spectrum as a whole shifts slightly left or right toward shorter or longer wavelengths. How this is accomplished is best understood with respect to FIG. 9B. As is evident from the Figure, the fiber coupler 70 includes four ports 71a–d connected to the back and front ends of the coil 55 forming the fiber ring cavity 53. The coupler further includes a tapered section 72 which is bendable. A slight bending of the tapered section by the strain source 73 causes its transmission spectrum as a whole to shift slightly left or right. To this end, the strain source 73 includes an extendible and retractable driver 74 in the form of an off-center circular cam 74 which is rotated by means of a shaft 77 rotated by a stepping motor 78 via a gear train 80. More or less pressure in the tapered section 72 by the cam 74 causes bending or relaxing of the tapered section 72.

If the bending or relaxing of the coupler 70 causes its transmission spectrum to be shifted left (toward shorter wavelengths), less of $\lambda_1$ and more of $\lambda_2$ will be transmitted and not coupled out of the fiber ring cavity 53, providing preferential feedback for $\lambda_2$. If the bending or relaxing of the coupler 70 causes its transmission spectrum to be shifted to the right, the situation is reversed. The amount of effective mirror loss difference created by the coupler tuning for a $GeO_2$-doped fiber ring and selected wavelengths of $\lambda_1$ and $\lambda_2$ separated by more than 20 nm can easily exceed ±10%, which is sufficient to achieve any desired balance between output powers at the two wavelengths while maintaining total output power at the same level. Advantageously, only one control parameter (i.e., the amount of bend at the tapered section 72 of the coupler) needs to be adjusted to change the balance of powers.

Although this invention has been described with respect to three preferred embodiments, various modifications and additions to the invention will become evident to persons of ordinary skill in the art. All such variations, modifications, and additions are intended to be encompassed within the scope of this patent, which is limited only by the claims appended hereto.

PARTS LIST

1. Raman laser of the invention
3. Lasing cavity
5. Length of gain fiber
7. Inlet or back end
9. Pump light
10. Outlet or front end
13. Amplified light
15. FBG back reflectors a, b
17. Tunable reflector assembly
19. Fixed FBG reflector
21. Tunable FBG reflector mechanism
23. FBG with trapezoidal reflection profile
25. Flexible substrate
27. Cantilever mount
29. Single Strain source
31. Extendible/retractable driver
35. Piezoelectric motor
37. Tunable FBG reflector mechanism
39. FBGs a, b
40. Connector
41. Flexible substrate
43. Front side
45. Back side
46. Support pins a, b
47. Single strain source
49. Extendible/retractable driver
50. Piezoelectric motor
51. Third embodiment
53. Fiber ring cavity
55. Optical fiber coil
56. Inlet or back end
58. Pump light
60. Outlet or front end
61. Amplified light
62. FBG Back reflectors a, b
64. FBG front reflectors a, b
66. Tunable reflector assembly
68. FBG pump light reflector
70. Wavelength selective fiber coupler
71. Ports a-d
72. Tapered section
73. Single source of strain
74. Cam
75. Tapered section of coupler
77. Shaft
76. Adhesive connector
78. Stepping motor
80. Gear train

What is claimed is:

1. A multiple spectral line laser with adjustable relative power output between said spectral lines, comprising:

a lasing cavity containing a medium for providing amplification of light at wavelengths $\lambda_1$ and $\lambda_2$;

first and second reflectors optically coupled to a back end of said cavity that reflect substantially all light having wavelengths of $\lambda_1$ and $\lambda_2$, respectively, and a tunable reflector assembly optically coupled to a front end of said cavity that reflects a selected proportion of said light having wavelengths of $\lambda_1$ and $\lambda_2$, said selected proportion being adjustable by application of a selected amount of strain on said tunable reflector assembly.

2. The multiple spectral line laser defined in claim 1, wherein said lasing cavity is linear, and said the reflector assembly includes a third reflector that reflects a fixed portion of between about 2% and 90% of light having said wavelength $\lambda_1$.

3. The multiple spectral line laser defined in claim 2, wherein said tunable reflector assembly further includes an FBG reflector having a trapezoidal spectral reflection profile.

4. The multiple spectral line laser defined in claim 3, wherein said trapezoidal reflection profile extends across a spectral band which is at least about 4 nm in width and which includes wavelength $\lambda_2$.

5. The multiple spectral line laser defined in claim 3, wherein said tunable FBG is written onto an optical fiber and said single source of strain stretches and relaxes the fiber to shift said spectral reflection profile of said FBG.

6. The multiple spectral line laser defined in claim 5, wherein said source of strain includes a piezoelectric driver that extends and retracts said tunable FBG in response to the application of an electric potential.

7. The multiple spectral line laser defined in claim 6, wherein said tunable FBG is mounted on a flexible substrate and said source of strain causes said substrate to bend thereby stretching and relaxing said FBG.

8. The multiple spectral line laser defined in claim 7, wherein the source of strain includes a motor and a gear train that converts rotational movement of a shaft of said motor into a bending of said flexible substrate.

9. The multiple spectral line laser defined in claim 2, wherein said first, second and third reflectors are fiber Bragg gratings (FBGs) having a spectral reflection width of between about 0.5 and 2 nm.

10. The multiple spectral line laser defined in claim 2, wherein said turnable FBG based reflector includes a pair of deformable fiber Bragg gratings (FBG) having spectral reflection profiles that partially overlap at or near the wavelength $\lambda_2$.

11. The multiple spectral line laser defined in claim 10, wherein said single source of strain causes a change in physical length of at least one FBG in said pair of spectral shift of its reflection profile by stretching and relaxing an optical fiber that said FBG is written in, thereby changing the amount of spectral overlap of the reflection profiles of the two gratings in said pair and amount of effective reflection at the wavelength $\lambda_2$.

12. The multiple spectral line laser defined in claim 11, wherein said single source of strain includes a piezoelectric driver that extends and retracts in response to the application of an electric potential.

13. The multiple spectral line laser defined in claim 10, wherein said at least one FBG in said pair is mounted on a flexible substrate and said single source of strain causes said substrate to bend thereby stretching and relaxing said FBG.

14. The multiple spectral line laser defined in claim 10, wherein said FBGs of said pair are mounted on opposite sides of a flexible substrate, and wherein said single source of strain applies a bending force on said substrate to such one of said FBGs while simultaneously compressing the other.

15. The multiple spectral line laser defined in claim 14, wherein said single source of strain includes a motor and a gear train that converts rotational movement of a shaft of said motor into a bending of said flexible substrate.

16. The multiple spectral line laser defined in claim 1, wherein $\lambda_1$ and $\lambda_2$ are separated by between about 4 and 30 nm in wavelength.

17. The multiple spectral line laser defined in claim 1, wherein said first and second reflectors reflect at leas 98% of incident light at said wavelength of $\lambda_1$ and $\lambda_2$, respectively.

18. The multiple spectral line laser defined in claim 17, wherein $\lambda_1$ and $\lambda_2$ are separated by about 4 and 30 nm in wavelength.

19. The multiple spectral line laser defined in claim 1, wherein said medium is an optical fiber that amplifies light by stimulated Raman scattering effect.

20. The multiple spectral line laser defined in claim 19, further comprising a pump light source coupled to the back end of said cavity and a pump reflector coupled to said front end of said cavity for reflecting substantially all pump light back into said cavity.

21. The multiple spectral line laser defined in claim 1, wherein said lasing cavity is a fiber ring cavity, and said tunable reflector assembly includes a four-port wavelength-selective fiber coupler with the four ports connected, respectively, to
an input waveguide;
an output waveguide;
the back end of said fiber ring cavity, and
the front end of said fiber ring cavity.

22. The multiple spectral line laser defined in claim 21, wherein said first and second reflectors are disposed in said input waveguide, and said output waveguide further comprises third and fourth reflectors that reflect a fixed portion of between about 2% and 90% of light having a wavelength of $\lambda_1$ and $\lambda_2$, respectively.

23. The multiple spectral line laser defined in claim 22, wherein said wavelength-selective fiber coupler transmits a variable amount of light having wavelengths of $\lambda_1$ and $\lambda_2$ to said output waveguide in response to said source and strain and returns light reflected by said third and fourth reflectors back into said fiber ring cavity.

24. The multiple spectral line laser defined in claim 23, wherein said wavelength-selective fiber coupler is a fused tapered fiber coupler and said source of strain tunes said coupler spectral transmission by bending said coupler at a tapered section.

25. The multiple spectral line laser defined in claim 24, wherein light in said fiber ring cavity is amplified by stimulated Raman scattering.

26. The multiple spectral line laser defined in claim 25, further comprising a pump light source coupled to said input waveguide and a pump reflector coupled to said output waveguide that reflects substantially all unused pump light wherein said wavelength selective fiber coupler couples substantially all light from said pump light source and all unused pump light reflected by said pump reflector into said fiber ring cavity.

27. The multiple spectral line laser defined in claim 26, wherein pump light is separated from the output light at wavelengths $\lambda_1$ and $\lambda_2$ by two Stokes shifts and said fiber coupler couples substantially all light at a first Stokes order of the pump light back into said ring cavity.

28. The multiple spectral line laser defined in claim 24, wherein said single source of strain includes a motor and a gear train that converts rotational movement of a shaft of said motor into a bending of said fused tapered fiber coupler.

29. The multiple spectral line laser defined in claim 22, wherein said first, second, third, and fourth reflectors are fiber Bragg gratings (FBGs) having a spectral reflection width of between about 0.5 and 2 nm.

30. A multiple spectral line laser with adjustable power output between said spectral lines, comprising:

a lasing cavity containing a medium for providing amplification of light at wavelengths from $\lambda_1$, to $\lambda_2$, where n is an integer>2;

n reflectors optically coupled to a back end of said cavity that reflect substantially all light having wavelengths of $\lambda_1 \ldots \lambda_n$, respectively;

a tunable reflector assembly optically coupled to a front end of said cavity that reflects a selected portion of said light having wavelengths $\lambda_1 \ldots \lambda_n$, said selected proportion being adjustable by application of selected amounts of strain on said tunable reflector assembly by n-1 sources of strain to control relative power output of light at these wavelengths.

\* \* \* \* \*